United States Patent
Ueno

(10) Patent No.: US 11,328,681 B2
(45) Date of Patent: May 10, 2022

(54) DISPLAY DEVICE AND DRIVE METHOD THEREOF

(71) Applicant: SHARP KABUSHIKI KAISHA, Sakai (JP)

(72) Inventor: Kohji Ueno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 176 days.

(21) Appl. No.: 16/629,801

(22) PCT Filed: Jul. 17, 2018

(86) PCT No.: PCT/JP2018/026670
§ 371 (c)(1),
(2) Date: Jan. 9, 2020

(87) PCT Pub. No.: WO2019/021878
PCT Pub. Date: Jan. 31, 2019

(65) Prior Publication Data
US 2021/0104203 A1    Apr. 8, 2021

(30) Foreign Application Priority Data

Jul. 24, 2017   (JP) .............................. JP2017-142721

(51) Int. Cl.
G09G 3/36        (2006.01)
(52) U.S. Cl.
CPC ......... G09G 3/3677 (2013.01); G09G 3/3655 (2013.01)

(58) Field of Classification Search
None
See application file for complete search history.

(56) References Cited

U.S. PATENT DOCUMENTS

| | | | |
|---|---|---|---|
| 9,672,087 B2* | 6/2017 | Lee | G06F 11/0706 |
| 2011/0148825 A1 | 6/2011 | Ueno | |
| 2011/0193831 A1 | 8/2011 | Kunimori | |
| 2015/0293546 A1 | 10/2015 | Tanaka et al. | |

(Continued)

FOREIGN PATENT DOCUMENTS

| | | |
|---|---|---|
| JP | 2010-217344 A | 9/2010 |
| JP | 2011-164328 A | 8/2011 |
| JP | 2016-186649 A | 10/2016 |

(Continued)

*Primary Examiner* — Andre L Matthews
(74) *Attorney, Agent, or Firm* — ScienBiziP, P.C.

(57) ABSTRACT

In a display device including a display panel, a plurality of scanning line drive circuits formed on the display panel, each driving scanning lines individually, and a display control circuit, the scanning line drive circuit outputs a state signal, and the display control circuit determines whether a state is normal based on the state signal, performs control, in a normal state, for making the plurality of scanning line drive circuits operate in turn, and performs control, in an abnormal state, for stopping an operation of an abnormal scanning line drive circuit and for making a normal scanning line drive circuit operate in turn. A last-stage output signal of the scanning line drive circuit is used as the state signal. With this, a display device capable of lengthening time until an abnormality occurs and keeping display quality even when the abnormality occurs is provided.

11 Claims, 14 Drawing Sheets

(56) References Cited

U.S. PATENT DOCUMENTS

2017/0047032 A1 2/2017 Nishiyama et al.
2018/0025695 A1* 1/2018 Han .................... G09G 3/3677
                                                                                    345/213

FOREIGN PATENT DOCUMENTS

WO       2010/041649 A1    4/2010
WO       2015/163305 A1   10/2015

* cited by examiner

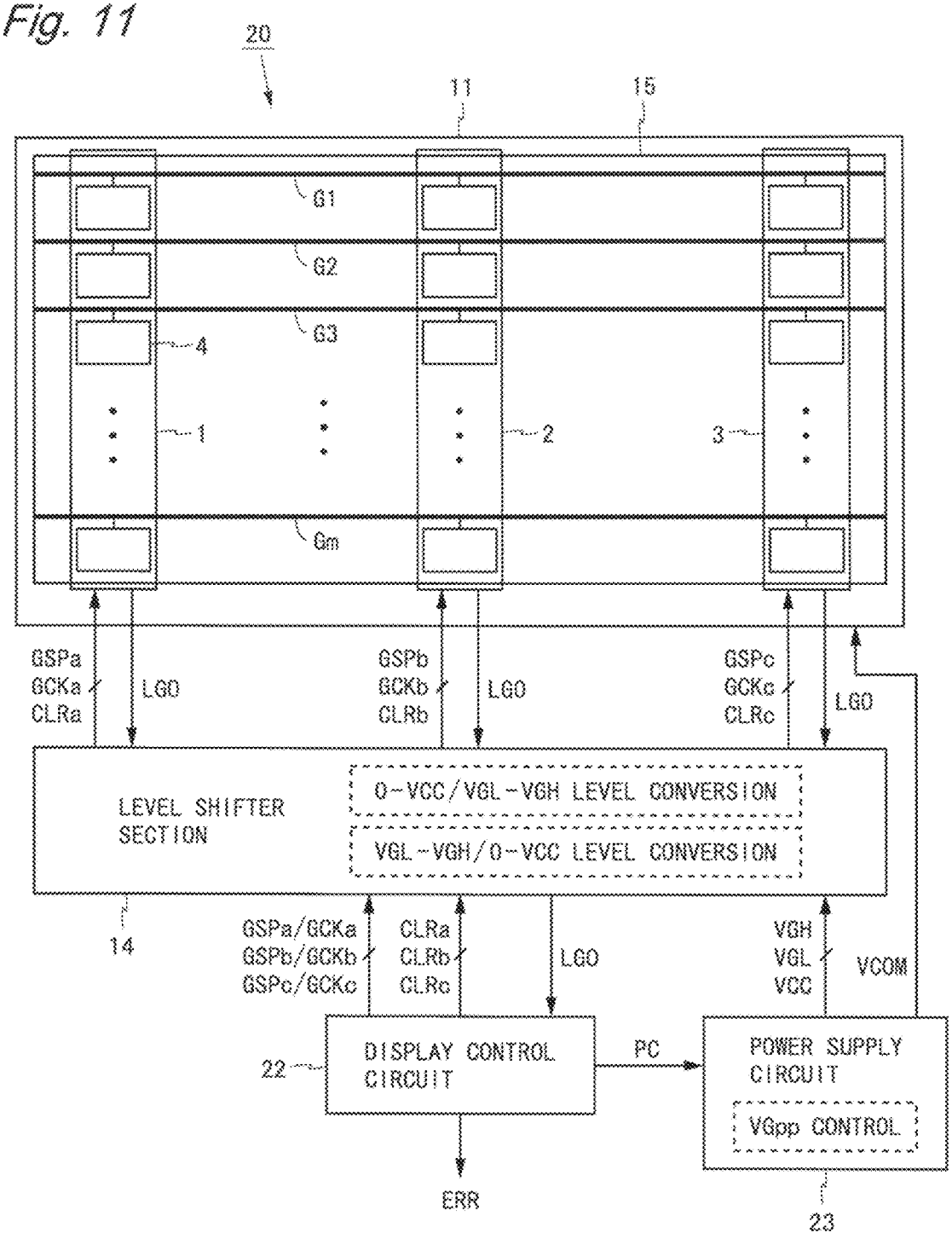

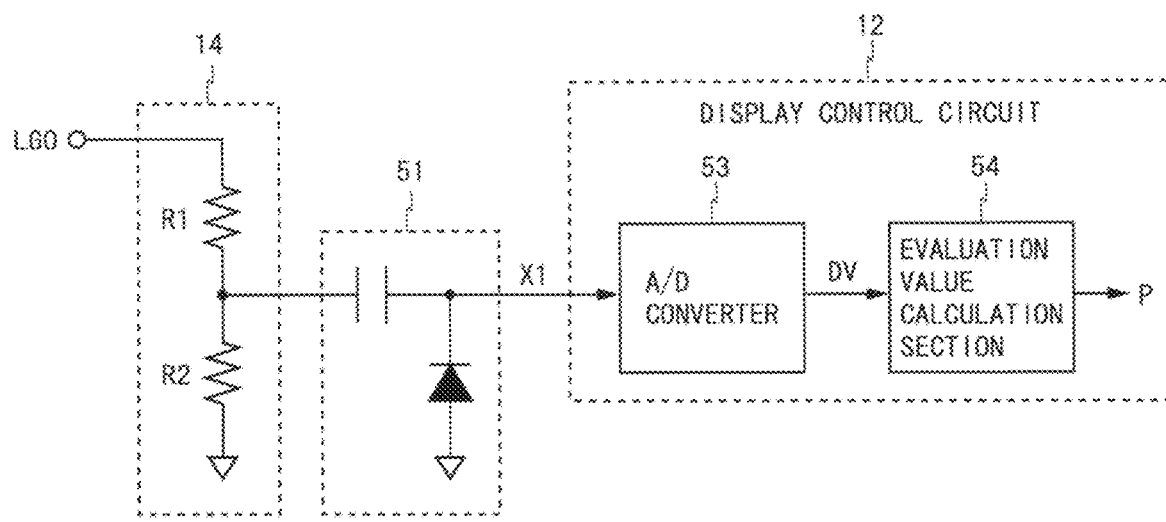

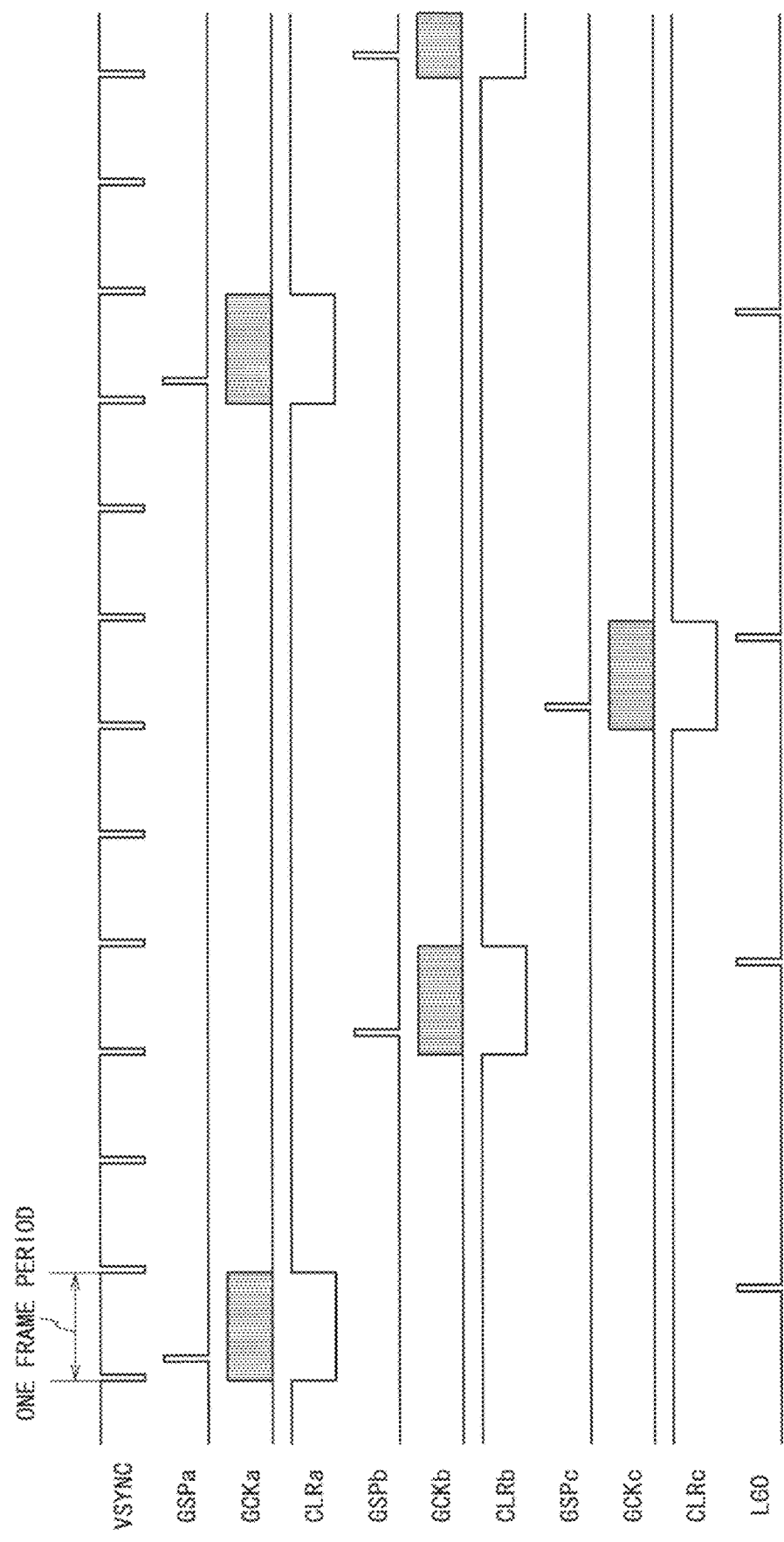

DISPLAY DEVICE AND DRIVE METHOD THEREOF

TECHNICAL FIELD

The present invention relates to a display device, and more particularly relates to a display device having a plurality of scanning line drive circuits and a drive method thereof.

BACKGROUND ART

Liquid crystal display devices are widely used as thin, light-weight, and low power consumption display devices. A liquid crystal panel provided to the liquid crystal display device includes a plurality of scanning lines, a plurality of data lines, and a plurality of pixel circuits. The liquid crystal display device is provided with a scanning line drive circuit which drives the scanning lines and a data line drive circuit which drives the data lines. The scanning line is also called a gate line, and the scanning line drive circuit is also called a gate driver.

In the liquid crystal display device, in order to downsize the device, a method of forming the scanning line drive circuit together with the pixel circuits on the liquid crystal panel may be adopted. This method is called a gate driver monolithic technology, and the scanning line drive circuit using this method is called a monolithic gate driver. Furthermore, a method in which the scanning line drive circuit is arranged inside a pixel area (arrangement area of the pixel circuits) on the liquid crystal panel is also known. This method is called an in-pixel gate driver monolithic (hereinafter referred to as IPGDM) technology.

The scanning line drive circuit has a configuration in which a plurality of unit circuits are connected in multi-stage, and sequentially transfers a pulse supplied to the unit circuit in a first stage to the unit circuits in later stages. The scanning line drive circuit formed on the liquid crystal panel is configured using a thin film transistor (hereinafter referred to as TFT) together with the pixel circuits. However, a threshold voltage of the TFT changes gradually during operation. Thus, when a cumulative operation time of the scanning line drive circuit becomes long, the threshold voltage of the TFT in the unit circuit changes greatly, and a voltage level of an output signal of the unit circuit decreases. As a result, the scanning line drive circuit may not be able to transfer the pulse correctly.

FIG. 19 is a signal waveform diagram of a conventional liquid crystal display device. In an initial state, substantially rectangular pulses appear on scanning lines G1 to Gm (FIG. 19(a)) in order. The pulses on the scanning lines G1 to Gm become duller toward the last, and a degree to which the pulse becomes dull increases with passage of time (FIG. 19(b)). When a predetermined time passes, the pulse on a certain scanning line becomes considerably small, and the pulse does not appear on later scanning lines (FIG. 19(c)). As a result, a transfer failure (hereinafter referred to as an abnormality) occurs in the scanning line drive circuit.

Thus, as a method for lengthening a life of the liquid crystal display device, a drive method (hereinafter referred to as shift drive) in which a plurality of scanning line drive circuits are provided to the liquid crystal display device and the plurality of scanning line drive circuits are made to operate in turn is known. In the liquid crystal display device performing the shift drive, since the plurality of scanning line drive circuits operate in turn, the cumulative operation time of each scanning line drive circuit is shortened. Therefore, an amount of change in the threshold voltage of the TFT in the unit circuit can be reduced, and time until the abnormality occurs in the scanning line drive circuit can be lengthened.

Related to the invention of the present application, Patent Document 1 discloses a display device including a plurality of signal line drive circuits connected to a same signal line, a judgement means for judging whether at least one of the plurality of signal line drive circuits has a failure based on an output timing of a signal which is output from each of the signal line drive circuits, and a switch means for switching to another normal signal line drive circuit when judged that a signal line drive circuit has a failure. Patent Document 2 also describes a similar display device. Patent Document 3 describes a display device using the IPGDM technology.

PRIOR ART DOCUMENTS

Patent Documents

[Patent Document 1] International Publication No. WO 2010/41649
[Patent Document 2] Japanese Laid-Open Patent Publication No. 2010-217344
[Patent Document 3] Japanese Laid-Open Patent Publication No. 2016-186649

SUMMARY OF THE INVENTION

Problems to be Solved by the Invention

For example, in the liquid crystal display device performing the shift drive using two scanning line drive circuits, a case where an abnormality occurs in one of the scanning line drive circuits and the other scanning line drive circuit still operates normally is more likely than a case where the abnormalities occur in the two scanning line drive circuits at the same time. When the abnormality occurs in one of the scanning line drive circuits, display quality degrades because a normal screen and an abnormal screen are displayed in a mixed manner. Furthermore, the liquid crystal display device is often used being built in a device, not as a single display device. Since the liquid crystal display device built in the device cannot be repaired or replaced immediately, degradation of the display quality when then abnormality occurs becomes a more serious problem.

Therefore, providing a display device capable of lengthening time until an abnormality occurs and keeping display quality even when the abnormality occurs is taken as a problem.

Means for Solving the Problems

The above problem can be solved for example by a display device including: a display panel including a plurality of scanning lines and a plurality of pixel circuits; a plurality of scanning line drive circuits formed on the display panel, each configured to drive the scanning lines individually; and a display control circuit, the scanning line drive circuit is configured to output a state signal, and the display control circuit is configured to determine whether a state is normal based on the state signal, to perform control, in a normal state, for making the plurality of scanning line drive circuits operate in turn, and to perform control, in an abnormal state, for stopping an operation of an abnormal scanning line drive circuit and for making a normal scanning line drive circuit operate.

The above problem can be also solved by a drive method of a display device having a display panel including a plurality of scanning lines and a plurality of pixel circuits, and a plurality of scanning line drive circuits formed on the display panel, each driving the scanning lines individually, and the method includes steps of: determining whether a state is normal based on a state signal which is output from the scanning line drive circuit; performing control, in a normal state, for making the plurality of scanning line drive circuits operate in turn; and performing control, in an abnormal state, for stopping an operation of an abnormal scanning line drive circuit and for making a normal scanning line drive circuit operate.

Effects of the Invention

According to the above display device and the drive method of the display device, by performing control, in the normal state, for making the plurality of scanning line drive circuits operate in turn, and performing control, in the abnormal state, for stopping the operation of the abnormal scanning line drive circuit and for making the normal scanning line drive circuit operate, time until an abnormality occurs in the scanning line drive circuit can be lengthened, and display quality can be kept even when the abnormality occurs in the scanning line drive circuit.

BRIEF DESCRIPTION OF THE DRAWINGS

FIG. 11 is a block diagram showing a configuration of a liquid crystal display device according to a third embodiment.

FIG. 12 is a diagram showing a control method of a power supply voltage in the liquid crystal display device shown in FIG. 11.

FIG. 14 is a diagram showing a control method of a power supply voltage in the liquid crystal display device shown in FIG. 13.

FIG. 15 is a diagram showing an evaluation value calculation section of a liquid crystal display device according to a fifth embodiment.

FIG. 16 is a diagram showing a calculation method of an evaluation value in the liquid crystal display device according to the fifth embodiment.

FIG. 17 is a signal waveform diagram of a liquid crystal display device according to a modification in the abnormal state.

MODES FOR CARRYING OUT THE INVENTION

First Embodiment

Figure 1:
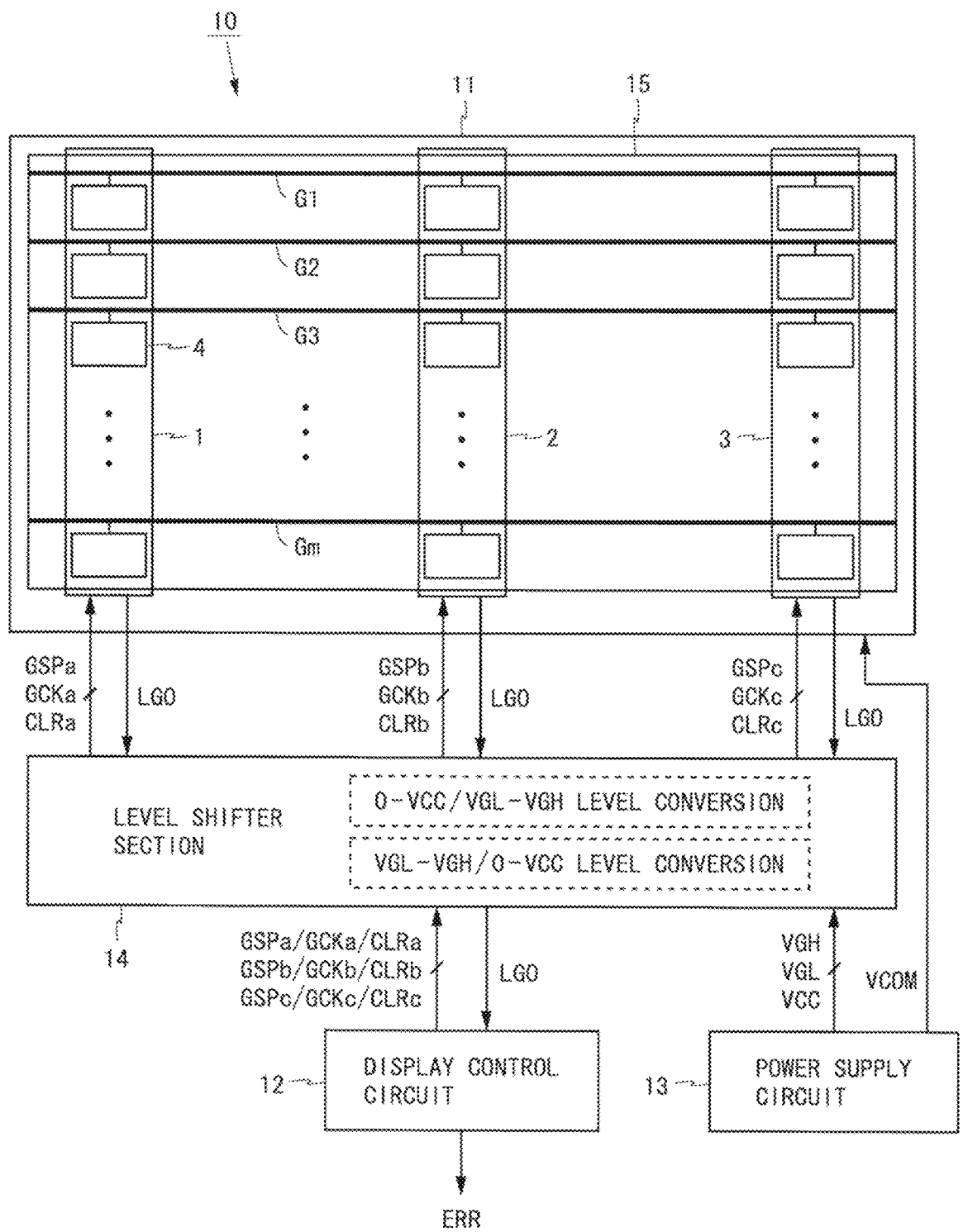
FIG. 1 is a block diagram showing a configuration of a liquid crystal display device according to a first embodiment.

FIG. 1 is a block diagram showing a configuration of a liquid crystal display device according to a first embodiment. A liquid crystal display device 10 shown in FIG. 1 includes a liquid crystal panel 11, a display control circuit 12, a power supply circuit 13, and a level shifter section 14. In the following, a horizontal direction of the drawings is referred to as a row direction, and a vertical direction of the drawings is referred to as a column direction. It is assumed that m is an integer not less than 2, and i is an integer not less than 1 and not more than m.

A pixel area 15 is set to the liquid crystal panel 11. Inside the pixel area 15, m scanning lines G1 to Gm, a plurality of data lines (not shown), and a plurality of pixel circuits (not shown) are formed. The scanning lines G1 to Gm extend in the row direction and are arranged in parallel with each other. The data lines extend in the column direction and are arranged in parallel with each other so as to intersect with the scanning lines G1 to Gm perpendicularly. The pixel circuits are arranged two-dimensionally corresponding to intersections of the scanning lines G1 to Gm and the data lines.

The liquid crystal display device 10 includes three scanning line drive circuits 1 to 3 which drive the scanning lines G1 to Gm, and a data line drive circuit (not shown) which drives the data lines. The scanning line drive circuits 1 to 3 are monolithic gate drivers formed on the liquid crystal panel 11 together with the pixel circuits. Furthermore, the scanning line drive circuits 1 to 3 are IPGDM circuits formed inside the pixel area 15 of the liquid crystal panel 11. In the following description, the scanning line drive circuits 1 to 3 are referred to as first to third GDM (Gate Driver Monolithic) circuits 1 to 3, respectively.

Each of the first to third GDM circuits 1 to 3 has a rectangular shape which is longer in the column direction. The first GDM circuit 1 is arranged near a left end of the pixel area 15 and is connected to portions near left ends of the scanning lines G1 to Gm. The second GDM circuit 2 is arranged near a center of the pixel area 15 and is connected to portions near centers of the scanning lines G1 to Gm. The third GDM circuit 3 is arranged near a right end of the pixel area 15 and is connected to portions near right ends of the scanning lines G1 to Gm. In a normal state, the display control circuit 12 performs control for making the first to third GDM circuits 1 to 3 operate in turn (shift drive). Each of the first to third GDM circuits 1 to 3 drives the scanning lines G1 to Gm individually under a control of the display control circuit 12.

It is assumed that a high-level voltage of input/output signals of the liquid crystal panel 11 is VGH, and a low-level voltage of the input/output signals is VGL. It is assumed that a high-level voltage of input/output signals of the display control circuit 12 is VCC, and a low-level voltage of the input/output signals is 0 V. The power supply circuit 13 outputs three kinds of voltages VGH, VGL, VCC to the level shifter section 14, and outputs a common electrode voltage VCOM to the liquid crystal panel 11. The high-level voltage VGH and the low-level voltage VGL are used for driving the scanning lines G1 to Gm. The common electrode voltage VCOM is applied to a common electrode (not shown) of the liquid crystal panel 11.

The level shifter section 14 performs level conversion between the input/output signals of the liquid crystal panel 11 and the input/output signals of the display control circuit 12. The level shifter section 14 performs process (0-VCC/VGL-VGH level conversion) for converting voltage levels of the output signals of the display control circuit 12 into voltage levels of the input signals of the liquid crystal panel 11 and process (VGL-VGH/0-VCC level conversion) for converting voltage levels of the output signals of the liquid crystal panel 11 into voltage levels of the input signals of the display control circuit 12.

The display control circuit 12 outputs various kinds of control signals required for driving the liquid crystal panel 11. The control signals output from the display control circuit 12 include gate start pulses GSPa to GSPc, gate clocks GCKa to GCKc, and clear signals CLRa to CLRc. When stopping an operation of the first GDM circuit 1, the display control circuit 12 controls the gate start pulse GSPa and the gate clock GCKa to a low level and controls the clear signal CLRa to a high level. The display control circuit 12 outputs similar control signals to the second and third GDM circuits 2, 3.

The level shifter section 14 performs the level conversion (0-VCC/VGL-VGH level conversion) on the control signals output from the display control circuit 12, and outputs converted control signals to the first to third GDM circuits 1 to 3. The level shifter section 14 outputs converted control signals GSPa, GCKa, and CLRa to the first GDM circuit 1, outputs converted control signals GSPb, GCKb, and CLRb to the second GDM circuit 2, and outputs converted control signals GSPc, GCKc, and CLRc to the third GDM circuit 3.

Each of the first to third GDM circuits 1 to 3 has a configuration in which unit circuits 4 are connected in multi-stage (see FIG. 2 described later). The first GDM circuit 1 drives the scanning lines G1 to Gm based on the converted control signals GSPa, GCKa. The second GDM circuit 2 drives the scanning lines G1 to Gm based on the converted control signals GSPb, GCKb. The third GDM circuit 3 drives the scanning lines G1 to Gm based on the converted control signals GSPc, GCKc. The first GDM circuit 1 stops its operation when the clear signal CLRa is at the high level. The second GDM circuit 2 stops its operation when the clear signal CLRb is at the high level. The third GDM circuit 3 stops its operation when the clear signal CLRc is at the high level. Each of the first to third GDM circuits 1 to 3 outputs a signal (hereinafter referred to as a last-stage output signal LGO) on the scanning line Gm connected to the unit circuit 4 in a last stage, as a state signal to the level shifter section 14. The last-stage output signals LGO output from the first to third GDM circuits 1 to 3 are the same signal.

The level shifter section 14 performs the level conversion (VGL-VGH/0-VCC level conversion) on the last-stage output signals LGO output from the first to third GDM circuits 1 to 3, and outputs converted last-stage output signals LGO to the display control circuit 12.

The display control circuit 12 determines whether a state is normal based on the state signals output from the first to third GDM circuits 1 to 3. More specifically, the display control circuit 12 determines whether an abnormality occurs in the first to third GDM circuits 1 to 3 based on the converted last-stage output signal LGO, and outputs an abnormality detection result ERR. The abnormality detection result ERR output from the display control circuit 12 is input to a host device (not shown) connected to the liquid crystal display device 10.

Between the input/output signals of the liquid crystal panel 11 and the input/output signals of the display control circuit 12, although voltage levels are different, signal change timings are the same. Thus, in the following description, the two groups of signals are not distinguished except when necessary.

Figure 2:
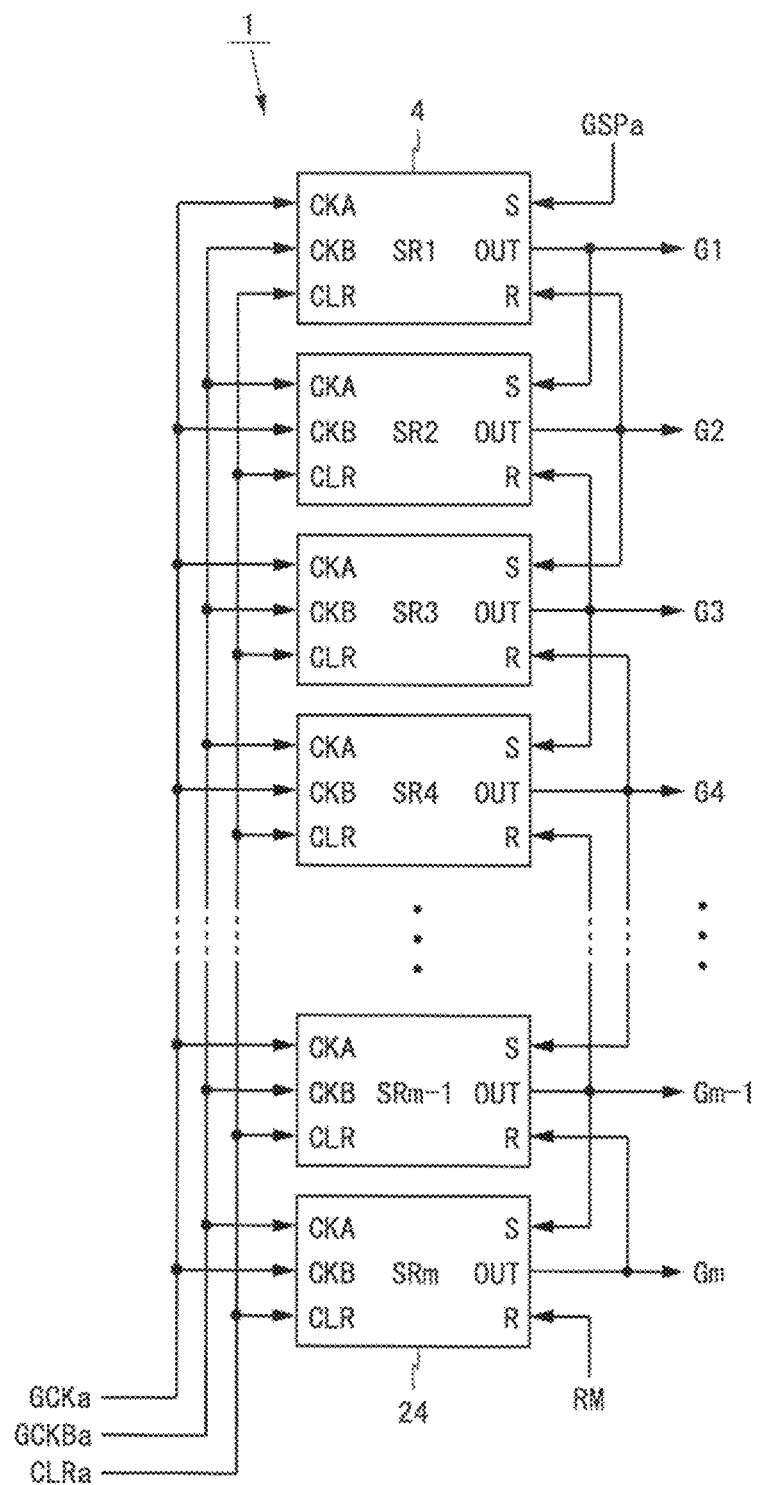
FIG. 2 is a block diagram showing a configuration of a GDM circuit shown in FIG. 1.

FIG. 2 is a block diagram showing a configuration of the first GDM circuit 1. As shown in FIG. 2, the first GDM circuit 1 has a configuration in which m pieces of the unit circuits 4 are connected in multi-stage. SRi (i is an integer not less than 1 and not more than m) represents the unit circuit 4 in an i-th stage. The unit circuit 4 has clock terminals CKA, CKB, a clear terminal CLR, a set terminal S, a reset terminal R, and an output terminal OUT. A signal GCKBa is an inverted signal of the gate clock GCKa. A signal RM is a gate end pulse supplied from the display control circuit 12, an output signal of a unit circuit in a dummy stage (not shown), or the like.

The gate clock GCKa is supplied to the clock terminals CKA of the unit circuits 4 in odd-numbered stages and the clock terminals CKB of the unit circuits 4 in even-numbered stages. The inverted signal GCKBa of the gate clock GCKa is supplied to the clock terminals CKB of the unit circuits 4 in the odd-numbered stages and the clock terminals CKA of the unit circuits 4 in the even-numbered stages. The clear signal CLRa is supplied to the clear terminals CLR of the unit circuits 4 in each stage. The gate start pulse GSPa is supplied to the set terminal S of the unit circuit 4 in a first stage, and to the set terminals S of other unit circuits 4, an output signal of the unit circuit 4 in a previous stage is supplied. The signal RM is supplied to the reset terminal R of the unit circuit 4 in the last stage, and to the reset terminals R of other unit circuits 4, the output signal of the unit circuit 4 in a next stage is supplied.

Figure 3:
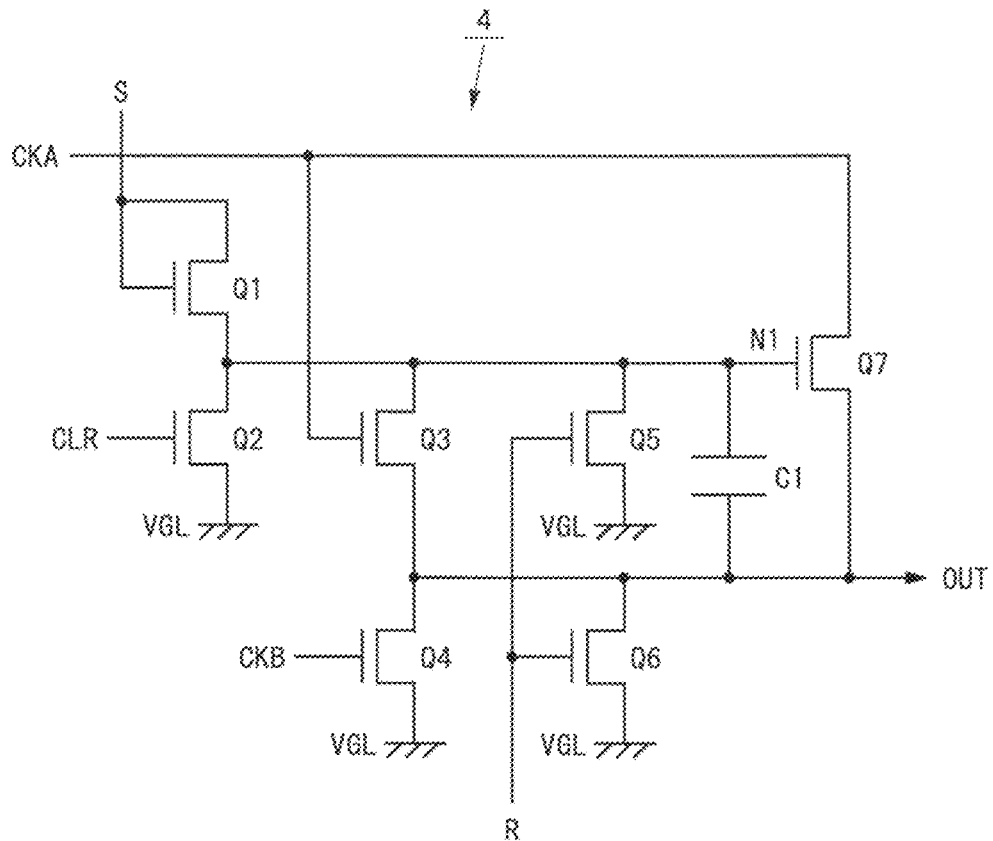
FIG. 3 is a circuit diagram of a unit circuit of the GDM circuit shown in FIG. 1.

FIG. 3 is a circuit diagram of the unit circuit 4. The unit circuit 4 includes seven TFTs Q1 to Q7 and a capacitor C1. The TFTs Q1 to Q7 are N-channel transistors. A drain terminal and a gate terminal of the TFT Q1 are connected to the set terminal S. A source terminal of the TFT Q1, drain terminals of the TFTs Q2, Q3, Q5, and a gate terminal of the TFT Q7 are connected to a node N1. Source terminals of the TFTs Q3, Q7 and drain terminals of the TFTs Q4, Q6 are connected to the output terminal OUT. A gate terminal of the TFT Q2 is connected to the clear terminal CLR. A gate terminal of the TFT Q3 and a drain terminal of the TFT Q7 are connected to the clock terminal CKA. A gate terminal of the TFT Q4 is connected to the clock terminal CKB. Gate terminals of the TFTs Q5, Q6 are connected to the reset terminal R. The low-level voltage VGL is applied to source terminals of the TFTs Q2, Q4 to Q6. The capacitor C1 is provided between the gate terminal and the source terminal of the TFT Q7.

Figure 4:
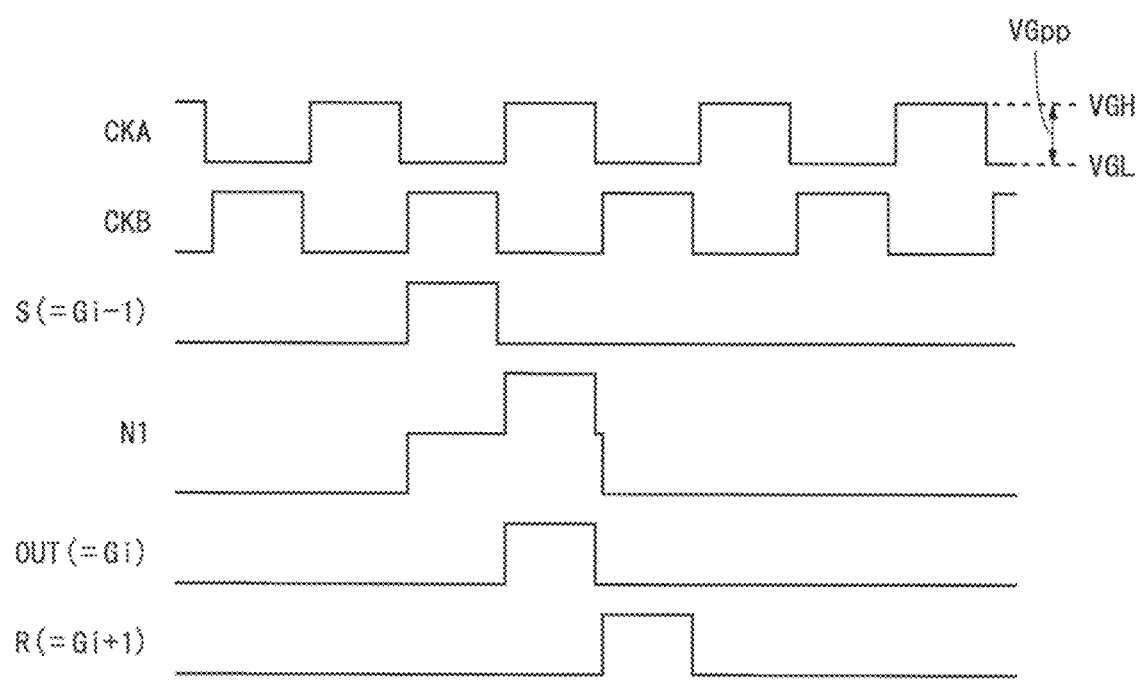
FIG. 4 is a signal waveform diagram of the GDM circuit shown in FIG. 1.

FIG. 4 is a signal waveform diagram of the first GDM circuit 1. When the clear signal CLRa supplied to the clear terminal CLR is at the low level, the TFT Q2 turns off. At this time, the unit circuit 4 transfers a pulse output from the unit circuit 4 in the previous stage to the unit circuit 4 in the next stage. Therefore, the first GDM circuit 1 sequentially transfers the gate start pulse GSPa supplied to the unit circuit 4 in the first stage to the unit circuits 4 in later stages. When the clear signal CLRa is at the high level, all signals input from the clock terminals CKA, CKB, the set terminal S, and the reset terminal R become the low level. At this time, since the TFT Q2 turns on and the TFTs Q1, Q3 to Q7 turn off, the first GDM circuit 1 does not apply any voltage to the scanning lines G1 to Gm. Each of the second and third GDM circuits 2, 3 has a configuration similar to that of the first GDM circuit 1 and operates similarly to the first GDM circuit 1.

Figure 5:
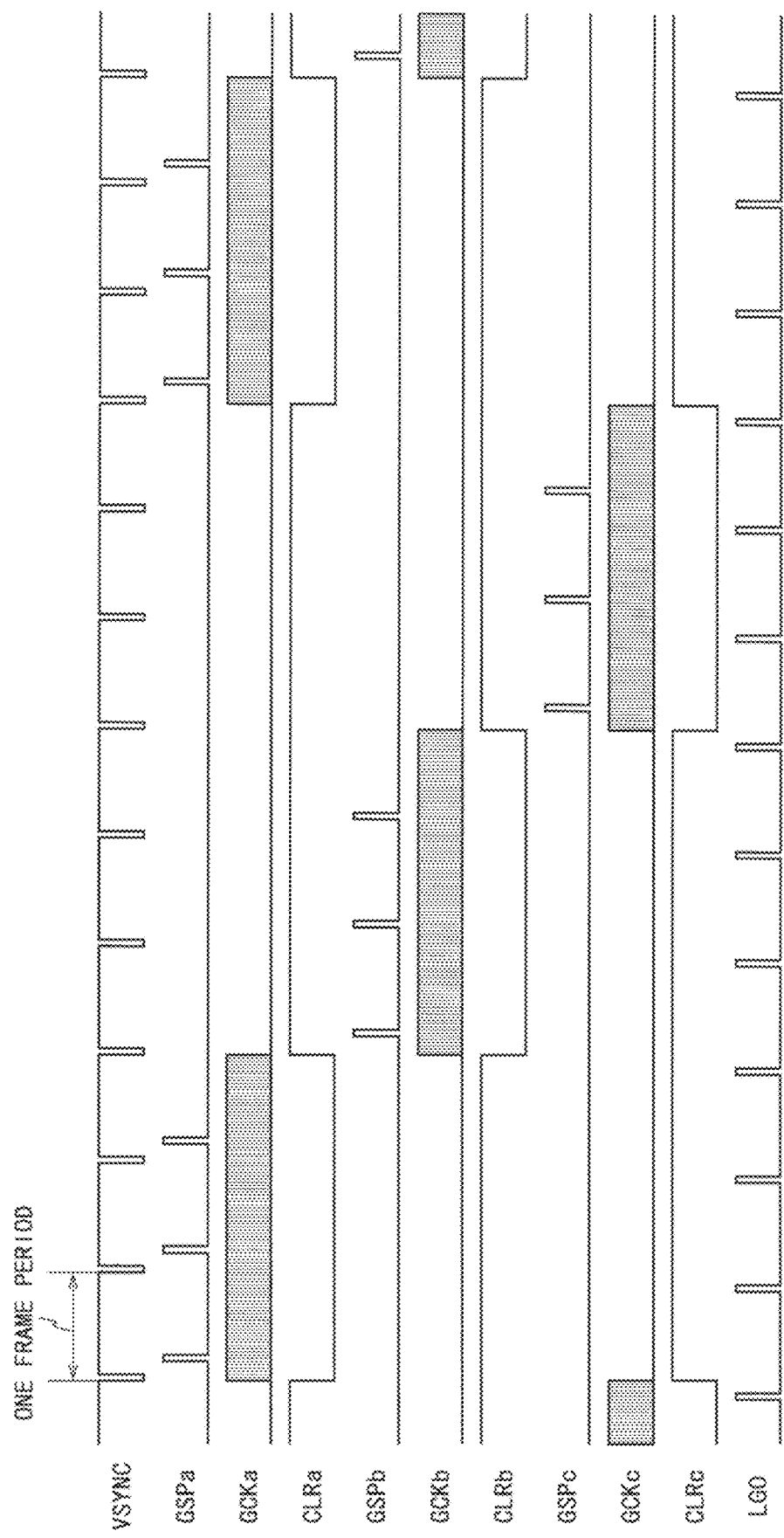
FIG. 5 is a signal waveform diagram of the liquid crystal display device shown in FIG. 1 in a normal state.

FIG. 5 is a signal waveform diagram of the liquid crystal display device 10 in the normal state. Hereinafter, the length of time during which one GDM circuit operates continuously is referred to as a shift cycle. In this example, the shift cycle is three frame periods. The display control circuit 12 performs control for making the first to third GDM circuits 1 to 3 operate for three frame periods in turn. Specifically, the display control circuit 12 repeatedly performs control for making the first GDM circuit 1 operate for three frame periods, control for making the second GDM circuit 2 operate for three frame periods, and control for making the third GDM circuit 3 operate for three frame periods. Therefore, cumulative operation times of the first to third GDM circuits 1 to 3 are ⅓ of that of the liquid crystal display device 10.

According to the liquid crystal display device 10, time until an abnormality occurs in the scanning line drive circuit can be lengthened by performing shift drive using the three GDM circuits. However, when the cumulative operation time of the liquid crystal display device 10 becomes long, an abnormality occurs in one of the GDM circuits. In an abnormal state, if the liquid crystal display device performing the shift drive performs same operation as that performed in the normal state, a normal screen and an abnormal screen are displayed in a mixed manner, and display quality degrades. Thus, in the liquid crystal display device 10, the display control circuit 12 determines whether an abnormality occurs in the first to third GDM circuits 1 to 3 based on the last-stage output signal LGO, and performs control, in the abnormal state, for stopping an operation of an abnormal GDM circuit and for making a normal GDM circuit operate in turn.

Figure 6:
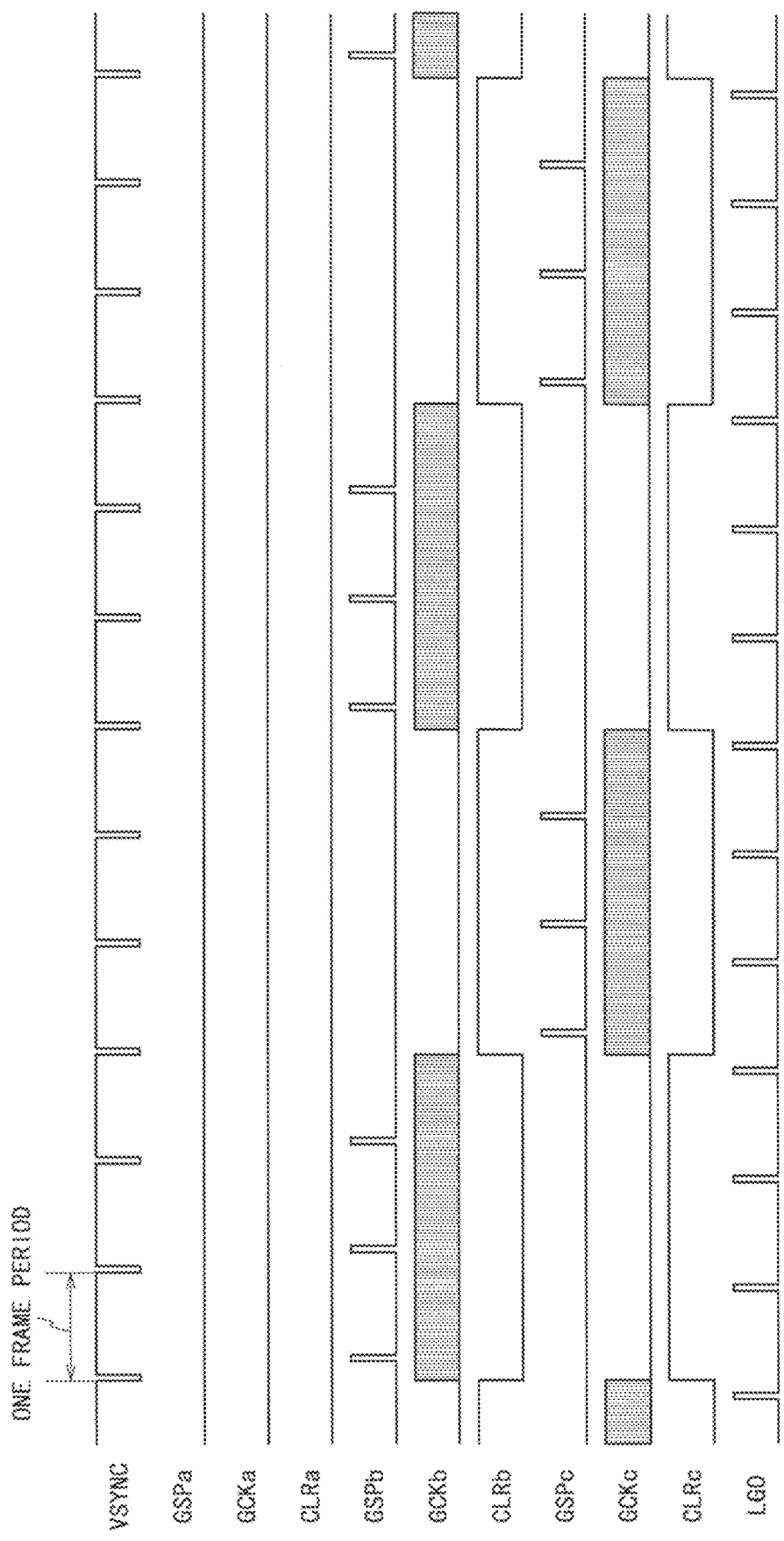
FIG. 6 is a signal waveform diagram of the liquid crystal display device shown in FIG. 1 in an abnormal state.

FIG. 6 is a signal waveform diagram of the liquid crystal display device 10 in the abnormal state. In this example, it is assumed that an abnormality occurs in the first GDM circuit 1 and the shift cycle in the abnormal state is three frame periods, as with that in the normal state. In this case, the display control circuit 12 performs control for stopping the operation of the first GDM circuit 1 and for making the second and third GDM circuits 2, 3 operate using a same shift cycle as that, in the normal state. Specifically, the display control circuit 12 controls the gate start pulse GSPa and the gate clock GCKa to the low level, and controls the clear signal CLRa to the high level. Concurrently, the display control circuit 12 repeatedly performs control for making the second GDM circuit 2 operate for three frame periods and control for making the third GDM circuit 3 operate for three frame periods. As the display control circuit 12 performs the above control in the abnormal state, only normal screens are displayed on the liquid crystal panel 11 even after the abnormality occurs. Therefore, display quality can be kept even when the abnormality occurs in the scanning line drive circuit.

Note that the shift cycle may be arbitrary, and may be one frame period, one second, ten seconds, or the like, for example. Furthermore, the shift cycle in the abnormal state may be longer than that in the normal state. For example, in a case where the shift cycle in the normal state is three frame periods, the shift cycle in the abnormal state may be six frame periods.

Figure 7:
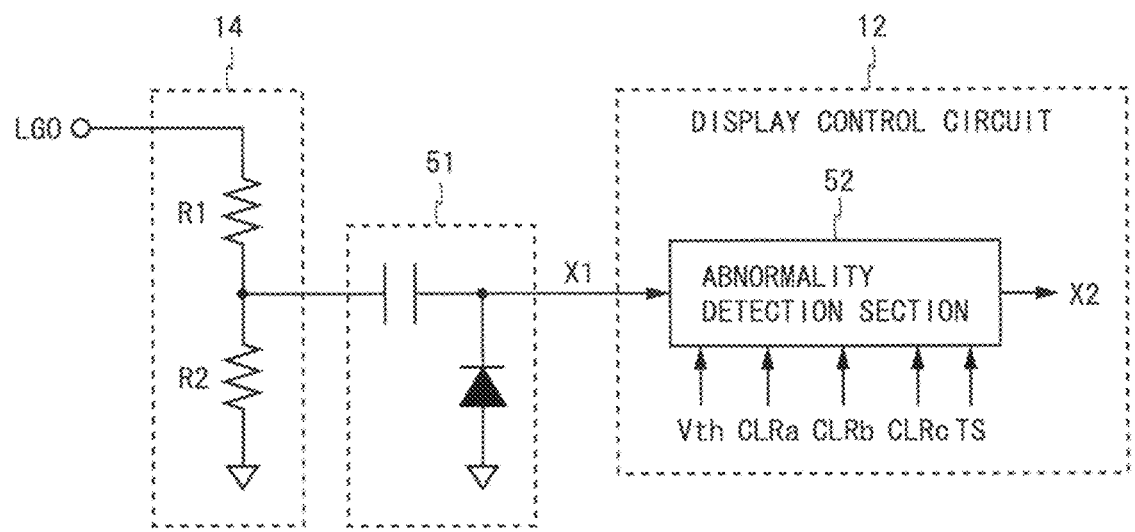
FIG. 7 is a diagram showing an abnormality detection section of the liquid crystal display device shown in FIG. 1.
Figure 8:
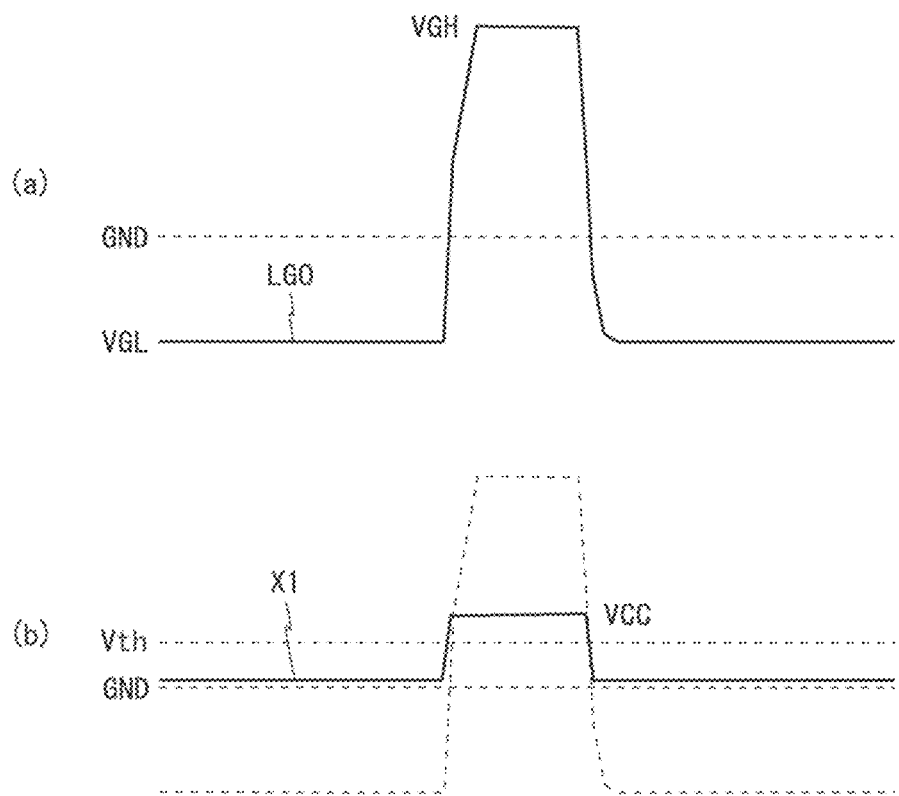
FIG. 8 is a signal waveform diagram of a last-stage output signal of the liquid crystal display device shown in FIG. 1.
Figure 9:
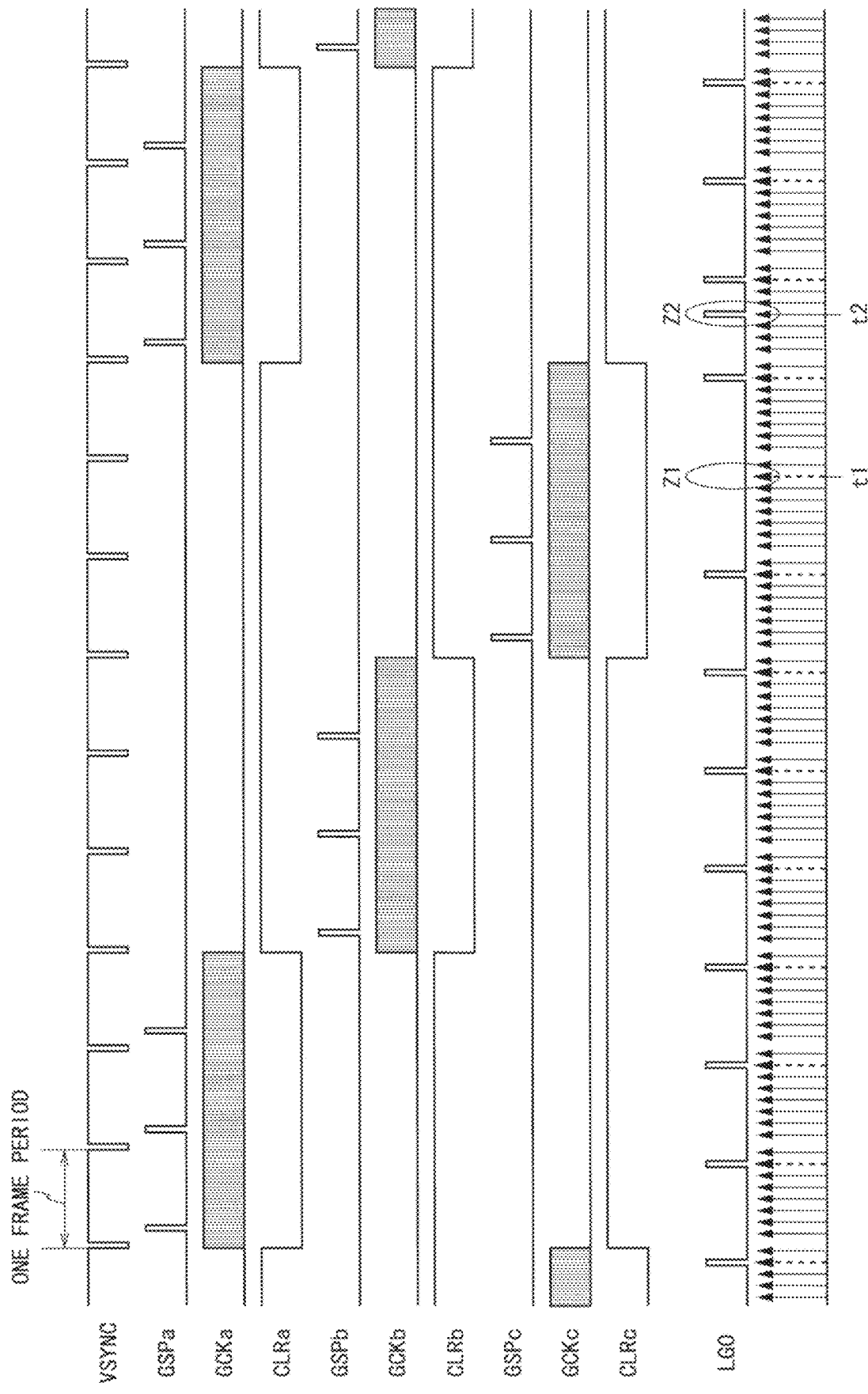
FIG. 9 is a diagram showing abnormality detection timings in the liquid crystal display device shown in FIG. 1.

With reference to FIGS. 7 to 9, a method for determining whether an abnormality occurs in the first to third GDM circuits based on the last-stage output signal LGO will be described. FIG. 7 is a diagram showing an abnormality detection section. The last-stage output signal LGO is input to the level shifter section 14. The level shifter section 14 performs the level conversion (VGL-VGH/0-VCC level conversion) on the last-stage output signal LGO using two resistors R1, R2 connected in series. A converted last-stage output signal LGO is clamped by a clamp circuit 51 configured by a diode and a capacitor. Hereinafter, an output signal of the clamp circuit 51 is referred to as X1.

FIG. 8 is a signal waveform diagram of the last-stage output signal LGO. In the normal state, a voltage of the last-stage output signal LGO (FIG. 8(*a*)) becomes VGH in a line period corresponding to the scanning line Gm, and becomes VGL otherwise. A voltage of the output signal X1 of the clamp circuit 51 (FIG. 8(*b*)) becomes VCC in the line period corresponding to the scanning line Gm, and becomes 0 V (=GND) otherwise.

As shown in FIG. 7, the output signal X1 of the clamp circuit 51 is input to an abnormality detection section 52 included in the display control circuit 12. A threshold voltage Vth, the clear signals CLRa to CLRc, and a timing signal TS indicating whether the line period corresponds to the scanning line Gm are input to the abnormality detection section 52. In an initial state, the abnormality detection section 52 outputs a signal X2 indicating that the state is normal. In a frame period when the clear signal CLRa is at the low level (frame period when the first GDM circuit 1 operates), when a voltage of the signal X1 is less than the threshold voltage Vth in the line period corresponding to the scanning line Gm or the voltage of the signal X1 is not less than the threshold voltage Vth in other line periods, the abnormality detection section 52 determines that an abnormality occurs in the first GDM circuit 1, and outputs the signal X2 indicating that. In a frame period when the clear signal CLRb is at the low level (frame period when the second GDM circuit 2 operates), when the voltage of the signal X1 satisfies the above condition, the abnormality detection section 52 determines that an abnormality occurs in the second GDM circuit 2, and outputs the signal X2 indicating that. In a frame period when the clear signal CLRc is at the low level (frame period when the third GDM circuit 3 operates), when the voltage of the signal X1 satisfies the above condition, the abnormality detection section 52 determines that an abnormality occurs in the third GDM circuit 3, and outputs the signal X2 indicating that.

FIG. 9 is a diagram showing abnormality detection timings in the liquid crystal display device 10. In FIG. 9, a dashed arrow represents an abnormality detection timing in the line period corresponding to the scanning line Gm, and a solid arrow represents another abnormality detection timing. In the normal state, the last-stage output signal LGO is at the high level at the abnormality detection timing in the line period corresponding to the scanning line Gm, and is at the low level at other abnormality detection timings. In a Z1 portion of FIG. 9, the last-stage output signal LGO is at the low level at an abnormality detection timing t1 in the line period corresponding to the scanning line Gm in a frame period when the clear signal CLRc is at the low level. The abnormality detection section 52 determines that an abnormality occurs in the third GDM circuit 3 based on the last-stage output signal LGO at this time. In a Z2 portion of FIG. 9, the last-stage output signal LGO is at the high level at another abnormality detection timing t2 in a frame period when the clear signal CLRa is at the low level. The abnormality detection section 52 determines that an abnormality occurs in the first GDM circuit 1 based on the last-stage output signal LGO at this time.

The display control circuit 12 outputs the abnormality detection result ERR to the host device based on the signal X2 output from the abnormality detection section 52. The abnormality detection result ERR may indicate whether an abnormality occurs in any of the GDM circuits, or may indicate in which of the GDM circuits an abnormality occurs. The display control circuit 12 may have a register for storing the abnormality detection result ERR, and the host device may read the abnormality detection result ERR stored in the register in the display control circuit 12.

When the host device recognizes that the abnormality occurs in the liquid crystal display device 10 based on the abnormality detection result ERR, the host device notifies a user of an occurrence of the abnormality by a method of displaying a warning screen, turning on a warning lamp, or the like. As described above, the liquid crystal display device 10 continues to display the normal screen even after the abnormality occurs. When the user recognizes that the abnormality occurs in the liquid crystal display device 10, the user repairs or replaces the liquid crystal display device 10 promptly.

As described above, the liquid crystal display device 10 according to the present embodiment includes a display panel (liquid crystal panel 11) including the plurality of scanning lines G1 to Gm and the plurality of pixel circuits, the plurality of scanning line drive circuits (first to third GDM circuits 1 to 3) formed on the display panel, each driving the scanning lines G1 to Gm individually, and the display control circuit 12. The scanning line drive circuit outputs the state signal (last-stage output signal LGO), and the display control circuit 12 performs control, in the normal state, for making the plurality of scanning line drive circuits operate in turn, and performs control, in the abnormal state, for stopping the operation of an abnormal scanning line drive circuit and for making a normal scanning line drive circuit operate in turn. In the abnormal state, the display control circuit 12 performs control for making the normal scanning line drive circuit operate using the same shift cycle as that in the normal state (or using the shift cycle longer than that in the normal state). The scanning line drive circuit is formed inside the pixel area 15 of the display panel.

According to the liquid crystal display device 10 according to the present embodiment, by performing control, in the normal state, for making the plurality of scanning line drive circuits operate in turn, and performing control, in the abnormal state, for stopping the operation of the abnormal scanning line drive circuit and for making the normal scanning line drive circuit operate, time until an abnormality occurs in the scanning line drive circuit can be lengthened, and display quality can be kept even when the abnormality occurs in the scanning line drive circuit. Furthermore, by using the last-stage output signal LGO as the state signal, whether the abnormality occurs in the scanning line drive circuit can be determined easily. Furthermore, the above-described effects can be achieved in a liquid crystal display device using the IPGDM technology. In the display device using the IPGDM technology, three or more scanning line drive circuits can be formed inside the pixel area. In the display device including the three or more scanning line drive circuits, in the abnormal state, control for stopping the operation of the abnormal scanning line drive circuit and for making the normal scanning line drive circuit operate in turn can be performed.

Second Embodiment

A liquid crystal display device according to a second embodiment has the same configuration as that of the liquid crystal display device 10 according to the first embodiment (see FIG. 1). In the abnormal state, the display control circuit according to the present embodiment performs control different from that performed by the liquid crystal display device 10 according to the first embodiment. Among components of each embodiment described below, same components as those described in any preceding embodiment are provided with the same reference numbers and description thereof is omitted.

In a liquid crystal display device having a plurality of GDM circuits, when an abnormality occurs in a certain GDM circuit, it is presumed that other GDM circuits deteriorate to a same degree. Thus, in the abnormal state, the liquid crystal display device according to the present embodiment displays a screen using a frame rate lower than that in the normal state. Specifically, in the abnormal state, the display control circuit according to the present embodiment performs control for stopping the operation of the abnormal GDM circuit and for making the normal GDM circuit operate in turn while having an all stop period.

Figure 10:
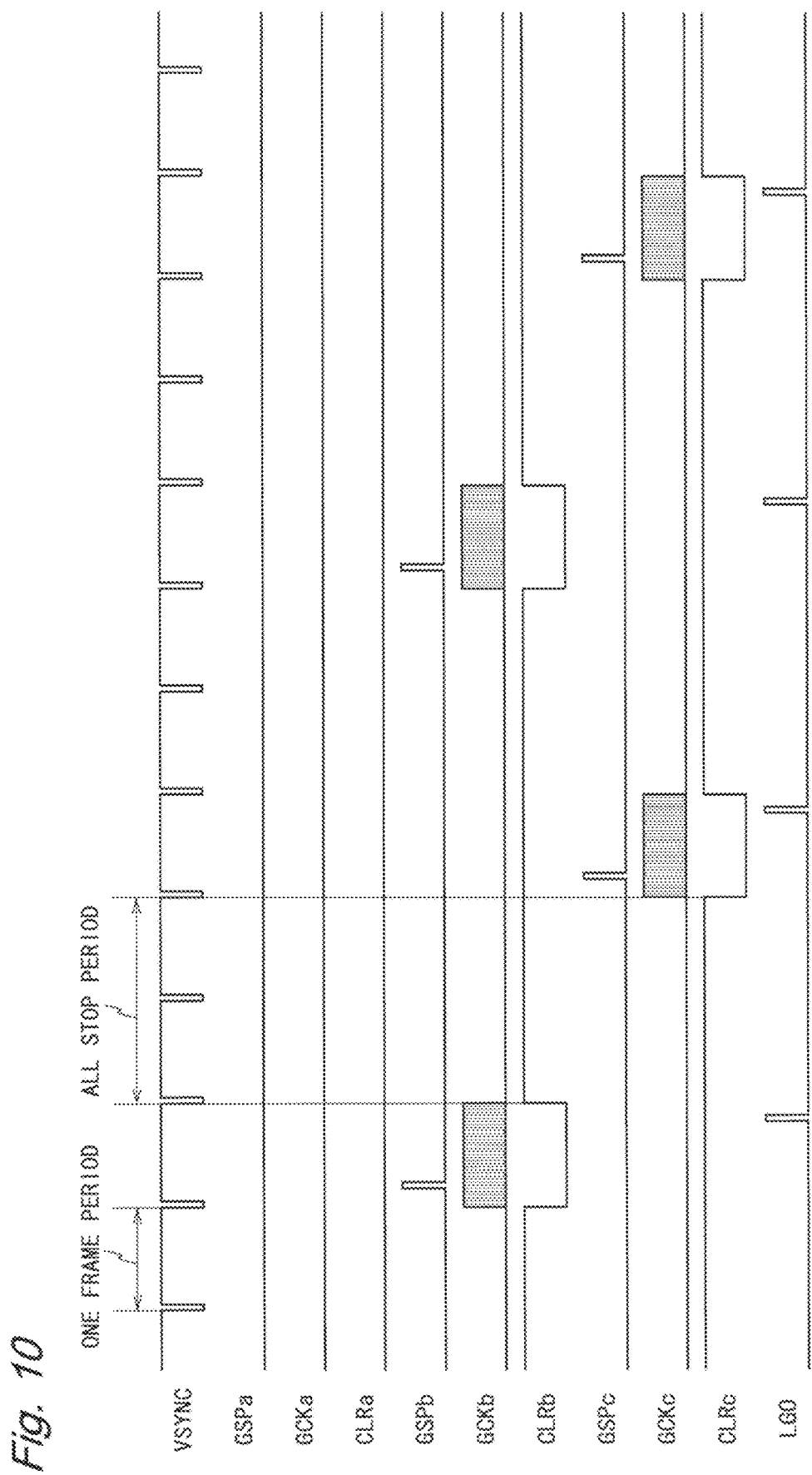
FIG. 10 is a signal waveform diagram of a liquid crystal display device according to a second embodiment in the abnormal state.

FIG. 10 is a signal waveform diagram of the liquid crystal display device according to the present embodiment in the abnormal state. In this example, it is assumed that an abnormality occurs in the first GDM circuit 1, a frame rate in the abnormal state is ⅓ of that in the normal state, and the shift cycle in the abnormal state is one frame period. In this case, the display control circuit according to the present embodiment performs control for stopping the operation of the first GDM circuit 1 and for making the second and third GDM circuits 2, 3 operate in turn for one frame period while having the all stop period of two frame periods. Specifically, the display control circuit according to the present embodiment controls the gate start pulse GSPa and the gate clock GCKa to the low level, and controls the clear signal CLRa to the high level. Concurrently, the display control circuit repeatedly performs control for making the second GDM circuit 2 operate for one frame period, control for stopping the operations of the second and third GDM circuits 2, 3 for two frame periods, control for making the third GDM circuit 3 operate for one frame period, and control for stopping the operations of the second and third GDM circuits 2, 3 for two frame periods.

Since the display control circuit performs the above-described control in the abnormal state, only the normal screens are displayed on the liquid crystal panel 11 using a frame rate lower than that in the normal state, even after the abnormality occurs. When the frame rate is low, since only a part of the frames is displayed, display quality degrades more than in the normal state. On the other hand, when the frame rate is lowered, the cumulative operation time of the normal GDM circuit increases more slowly than in the normal state. Therefore, an amount of change in a threshold voltage of the TFT in the unit circuit 4 can be reduced further, and time until an abnormality occurs in the normal GDM circuit can be lengthened.

According to the liquid crystal display device according to the present embodiment, by lowering the frame rate when the abnormality occurs in the scanning line drive circuit, the time until the abnormality occurs in the normal scanning line drive circuit can be lengthened. Such a liquid crystal display device is suitable for a case where a screen different from that displayed in the normal state (for example, a warning screen including less information than that in the normal state) is displayed in the abnormal state.

Third Embodiment

FIG. 11 is a block diagram showing a configuration of a liquid crystal display device according to a third embodiment. A liquid crystal display device 20 shown in FIG. 11 is obtained by replacing the display control circuit 12 and the power supply circuit 13 in the liquid crystal display device 10 according to the first embodiment with a display control circuit 22 and a power supply circuit 23, respectively. In the following, a difference between the high-level voltage VGH and the low-level voltage VGL output from the power supply circuit 23 is referred to as an amplitude VGpp of a power supply voltage (see FIG. 4).

The display control circuit 22 is obtained by adding to the display control circuit 12, a function of outputting a power supply control signal PC. The power supply control signal PC is a signal indicating the state of the scanning line drive circuits, and indicates whether an abnormality occurs in the first to third GDM circuits 1 to 3. For example, the power supply control signal PC becomes the low level in the normal state, and becomes the high level in the abnormal state (when an abnormality occurs in any of the first to third GDM circuits 1 to 3). The power supply control signal PC is output using an interface such as SPI (Serial Peripheral Interface), for example.

The power supply circuit 23 is obtained by adding to the power supply circuit 13, a function of, in the abnormal state, making the amplitude VGpp of the power supply voltage larger than that in the normal state based on the power supply control signal PC. FIG. 12 is a diagram showing a control method of the power supply voltage in the liquid crystal display device 20. As shown in FIG. 12, in the normal state, the power supply circuit 23 controls a level of the high-level voltage VGH to VGH1, and controls a level of the low-level voltage VGL to VGL1. In the abnormal state, the power supply circuit 23 controls the level of the high-level voltage VGH to VGH2, and controls the level of the low-level voltage VGL to VGL2. Note that in the abnormal state, the power supply circuit 23 may control at least one of the high-level voltage VGH and the low-level voltage VGL in order to make the amplitude VGpp of the power supply voltage larger.

As described above, in the liquid crystal display device having the plurality of GDM circuits, when an abnormality occurs in a certain GDM circuit, it is presumed that other GDM circuits deteriorate to the same degree. Thus, in the abnormal state, the display control circuit 22 according to the present embodiment performs control for making the amplitude VGpp of the power supply voltage larger, in addition to the control similar to that performed by the display control circuit 12 according to the first embodiment. In the abnormal state, the power supply circuit 23 makes the amplitude VGpp of the power supply voltage larger than that in the normal state based on the power supply control signal PC. When the amplitude VGpp of the power supply voltage becomes large, an amplitude of a pulses on the scanning lines G1 to Gm becomes large. Therefore, in the abnormal state, an operation margin of the normal GDM circuit increases, and the abnormality is unlikely to occur in the normal GDM circuit.

According to the liquid crystal display device 20 according to the present embodiment, when an abnormality occurs in the scanning line drive circuit, by making the amplitude VGpp of the power supply voltage larger than that in the normal state, the operation margin of the normal scanning line drive circuit can be made larger, and the abnormality can be made unlikely to occur in the normal scanning line drive circuit.

Fourth Embodiment

Figure 13:
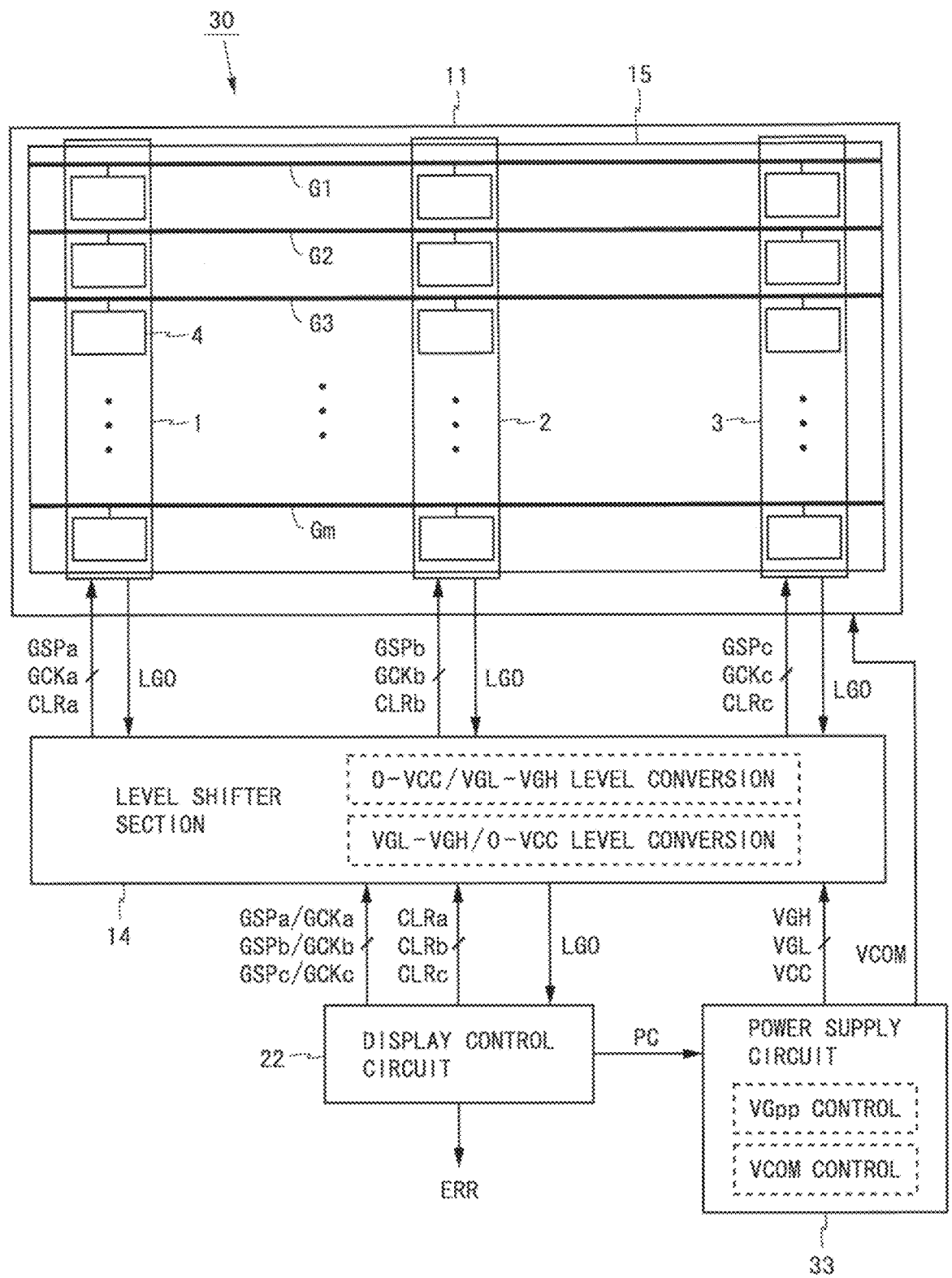
FIG. 13 is a block diagram showing a configuration of a liquid crystal display device according to a fourth embodiment.

FIG. 13 is a block diagram showing a configuration of a liquid crystal display device according to a fourth embodiment. A liquid crystal display device 30 shown in FIG. 13 is obtained by replacing the power supply circuit 23 in the liquid crystal display device 20 according to the third embodiment with a power supply circuit 33.

The power supply circuit 33 is obtained by adding to the power supply circuit 23, a function of controlling a level of the common electrode voltage VCOM based on the power supply control signal PC. Based on the power supply control signal PC, the power supply circuit 33 outputs a common electrode voltage to a common electrode (not shown) of the liquid crystal panel 11, the common electrode voltage having different levels between in the normal state and in the abnormal state. FIG. 14 is a diagram showing a control method of the power supply voltage in the liquid crystal display device 30. As shown in FIG. 14, in the normal state, the power supply circuit 33 controls the level of the high-level voltage VGH to VGH1, controls the level of the low-level voltage VGL to VGL1, and controls the level of the common electrode voltage VCOM to VCOM1. In the abnormal state, the power supply circuit 33 controls the level of the high-level voltage VGH to VGH2, controls the level of the low-level voltage VGL to VGL2, and controls the level of the common electrode voltage VCOM to VCOM2.

In general, in the liquid crystal display device, when the high-level voltage VGH or the low-level voltage VGL changes, an optimum value of the common electrode voltage VCOM of the liquid crystal panel changes, and flicker, burn-in, or the like may occur in a display screen. Thus, in the display device according to the present embodiment, the power supply circuit 33 outputs the common electrode voltage VCOM to the common electrode of the liquid crystal panel 11, the common electrode voltage VCOM having different levels between in the normal state and in the abnormal state based on the power supply control signal PC. With this, the flicker, the burn-in, or the like can be prevented from occurring in the display screen.

According to the liquid crystal display device 30 according to the present embodiment, when an abnormality occurs in the scanning line drive circuit, by outputting the common electrode voltage VCOM to the common electrode, the common electrode voltage VCOM having a level different from that in the normal state, the flicker or the burn-in can be prevented from occurring in the display screen in the abnormal state.

Fifth Embodiment

A liquid crystal display device according to a fifth embodiment has the same configuration as that of the liquid crystal display device 10 according to the first embodiment (see FIG. 1). In the liquid crystal display device according to the present embodiment, the display control circuit obtains an evaluation value P based on the state signal (last-stage output signal LGO) output from the scanning line drive circuit, and performs control for making the plurality of scanning line drive circuits operate in accordance with a ratio of the evaluation value P.

FIG. 15 is a diagram showing an evaluation value calculation section. The display control circuit 12 according to the present embodiment includes an A/D converter 53 and an evaluation value calculation section 54. The output signal X1 of the clamp circuit 51 is input to the A/D converter 53 and is converted into a digital value DV indicating the voltage of the signal X1.

The evaluation value calculation section 54 obtains the evaluation value P of the last-stage output signal WO based on the digital value DV obtained by the A/D converter 53. FIG. 16 is a diagram showing a calculation method of the evaluation value P. The evaluation value calculation section 54 sets the evaluation value P to 0 when the digital value DV is less than 2.0 V, sets the evaluation value P to 1 when the digital value DV is not less than 2.0 V and less than 2.3 V, sets the evaluation value P to 2 when the digital value DV is not less than 2.3 V and less than 2.7 V, and sets the evaluation value P to 3 when the digital value DV is not less khan 2.7 V. In the following, the evaluation values of the last-stage output signal LGO in the frame period when the first to third GDM circuits 1 to 3 operate are referred to as Pa, Pb, and Pc, respectively.

The display control circuit 12 according to the present embodiment performs control for making the first to third GDM circuits 1 to 3 operate in accordance with a ratio of the evaluation values Pa, Pb, and Pc. For example, in a case where DVa=DVb=DVc=2.8 V, Pa:Pb:Pc=3:3:3=1:1:1 is satisfied. In this case, the display control circuit 12 performs control for making the first to third GDM circuits 1 to 3 operate at the ratio of 1:1:1. In a case where DVa=2.5 V and DVb=DVc=2.8 V, Pa:Pb:Pc=2:3:3 is satisfied. In this case, the display control circuit 12 performs control for making the first to third GDM circuits 1 to 3 operate at the ratio of 2:3:3. In a case where DVa=2.1 V, DVb=2.4 V, DVc=2.8 V, Pa:Pb:Pc=1:2:3 is satisfied. In this case, the display control circuit 12 performs control for making the first to third GDM circuits 1 to 3 operate at the ratio of 1:2:3. In a case where DVa=1.9 V, DVb=2.2 V, DVc=2.5 V, Pa:Pb:Pc=0:1:2 is satisfied. In this case, the display control circuit 12 performs control for stopping the operation of the first GDM circuit 1 (controls the gate start pulse GSPa and the gate clock GCKa to the low level, and controls the clear signal CLRa to the high level), and for making the second and third GDM circuits 2, 3 operate at the ratio of 1:2.

According to the liquid crystal display device according to the present embodiment, since the display control circuit 12 obtains the evaluation values P based on the state signal (last-stage output signal LGO), and performs control for making the plurality of scanning line drive circuits operate in accordance with the ratio of the evaluation values P, an operation cycle of the scanning line drive circuit is changed in accordance with a degree of deterioration, time until an abnormality occurs in the scanning line drive circuit can be lengthened, and the display quality can be kept even when the abnormality occurs in the scanning line drive circuit.

Note that as for the liquid crystal display devices according to the first to fifth embodiments, various kinds of modifications can be configured. In the liquid crystal display devices according to the second to fourth embodiments, the display control circuit determines whether the state is normal based on the last-stage output signal LGO, and in the abnormal state, performs control (control performed in the abnormal state) different from that performed in the normal state. In a liquid crystal display device according to a modification, a display control circuit may obtain a degree of deterioration by the method described in the fifth embodiment based on the last-stage output signal LGO, and when determines that deterioration is in progress although the state is are not abnormal, may perform control (control performed when deterioration is in progress) different from that performed in the normal state. The control performed when deterioration is in progress may be same as that performed in the abnormal state or may be different from that performed in the abnormal state. When deterioration is in progress, a display control circuit according to a modification may set the frame rate to ⅓ of that in the normal state and may set the shift cycle to one frame period (see FIG. 17). When deterioration is in progress, a display control circuit according to a modification may make the amplitude VGpp of the power supply voltage larger than that in the normal state, or may set the common electrode voltage VCOM to a level different from that in the normal state.

Figure 18:
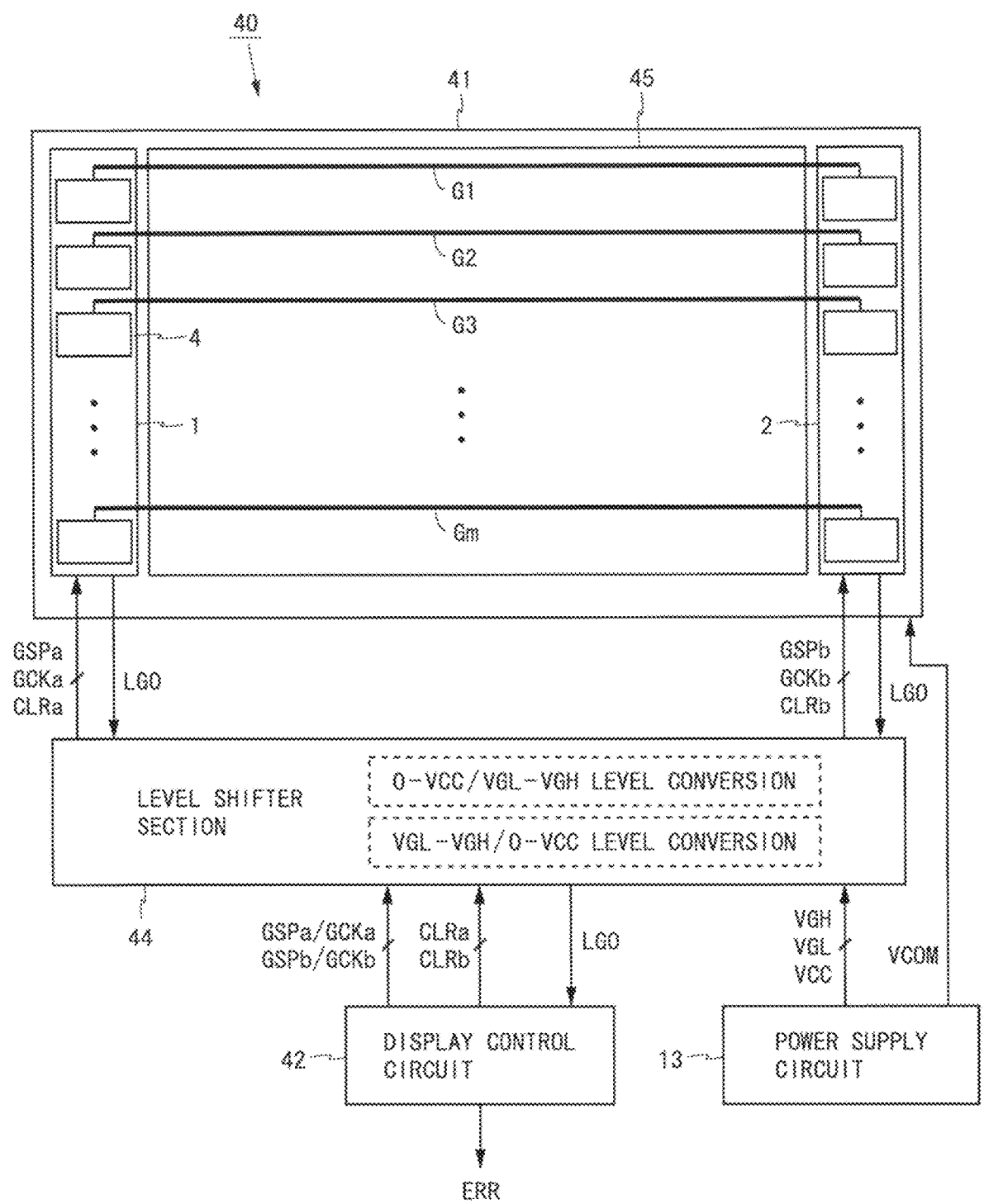
FIG. 18 is a block diagram showing a configuration of a liquid crystal display device according to a modification.
Figure 19:
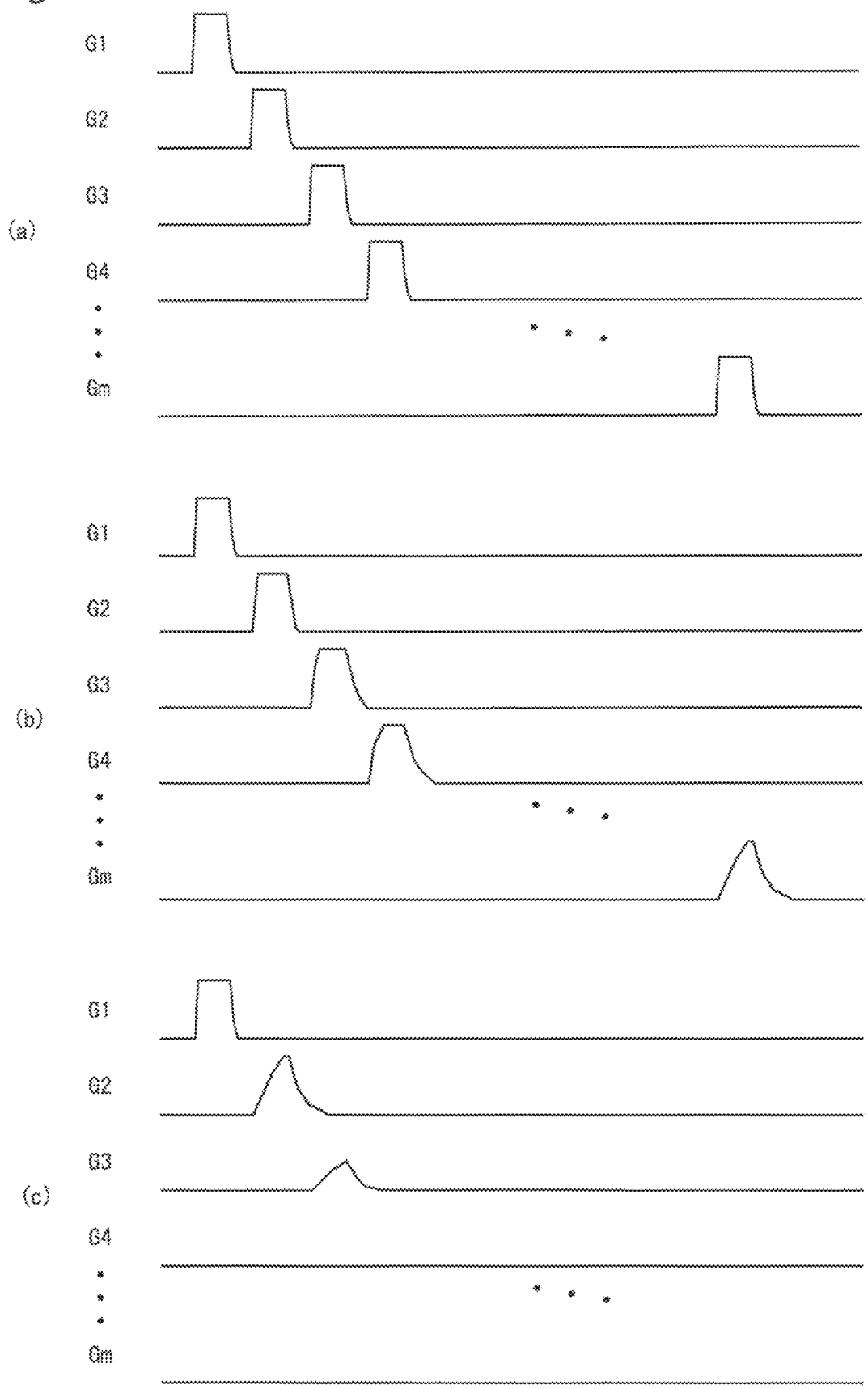
FIG. 19 is a signal waveform diagram of a conventional liquid crystal display device.

A liquid crystal display device according to a modification may be obtained by adding to the liquid crystal display device according to the fifth embodiment, features of the liquid crystal display device according to any one of the second to fourth embodiments. The first to third GDM circuits 1 to 3 may have a configuration other than that shown in FIG. 2, and the unit circuit 4 may have a configuration other than that shown in FIG. 1. In the liquid crystal display devices according to the first to fifth embodiments, three scanning line drive circuits are arranged inside the pixel area. A liquid crystal display device according to a modification may include two or four or more scanning line drive circuits. In a liquid crystal display device according to a modification, two or more scanning line drive circuits may be arranged outside the pixel area. FIG. 18 is a block diagram of a liquid crystal display device according to a modification. A liquid crystal display device 40 shown in FIG. 18 includes a liquid crystal panel 41, a display control circuit 42, the power supply circuit 13, and a level shifter section 44. The two scanning line drive circuits 1, 2 are arranged on the liquid crystal panel 41 outside a pixel area 45 (referred to as a frame portion).

Liquid crystal display devices according to various modifications can be configured by arbitrarily combining features of the above-described liquid crystal display devices unless contrary to its nature. A display device other than the liquid crystal display device can be configured by a similar method.

This application claims a priority based on Japanese Patent Application No. 2017-142721 filed on Jul. 24, 2017 and entitled "Display Device And Drive Method Thereof", which is incorporated herein by reference in its entirety.

DESCRIPTION OF REFERENCE CHARACTERS

1: FIRST GDM CIRCUIT (SCANNING LINE DRIVE CIRCUIT)
2: SECOND GDM CIRCUIT (SCANNING LINE DRIVE CIRCUIT)
3: THIRD GDM CIRCUIT (SCANNING LINE DRIVE CIRCUIT)
4: UNIT CIRCUIT
10, 20, 30, 40: LIQUID CRYSTAL DISPLAY DEVICE
11, 41: LIQUID CRYSTAL PANEL
12, 22, 42: DISPLAY CONTROL CIRCUIT
13, 23, 33: POWER SUPPLY CIRCUIT
14, 44: LEVEL SHIFTER SECTION
15, 45: PIXEL AREA
51: CLAMP CIRCUIT

52: ABNORMALITY DETECTION SECTION
53: A/D CONVERTER
54: EVALUATION VALUE CALCULATION SECTION

The invention claimed is:

1. A display device comprising:
a display panel including a plurality of scanning lines and a plurality of pixel circuits;
a plurality of scanning line drive circuits formed on the display panel, each of the plurality of scanning line drive circuits configured to drive the scanning lines individually;
a power supply circuit configured to output a power supply voltage used for driving the plurality of scanning lines; and
a display control circuit, wherein:
each of the plurality of scanning line drive circuits is configured to output a state signal;
the display control circuit is configured to determine whether a state is normal based on the state signal output by each of the plurality of scanning line drive circuits, to perform control in a normal state, to cause the plurality of scanning line drive circuits to operate in turn, and to perform control in an abnormal state, to cause an operation of an abnormal scanning line drive circuit of the plurality of scanning line drive circuits to stop and to cause a normal scanning line drive circuit of the plurality of scanning line drive circuits to operate;
the display control circuit is further configured to output a power supply control signal to the power supply circuit, the power supply control signal indicating the state of each of the plurality of scanning line drive circuits; and
the power supply circuit is further configured to, in the abnormal state, increase an amplitude of the power supply voltage to greater than an amplitude of the power supply voltage in the normal state based on the power supply control signal.

2. The display device according to claim 1, wherein:
three or more scanning line drive circuits are provided; and
the display control circuit is further configured to perform control in the abnormal state, to cause each of a plurality of the normal scanning line drive circuits to operate in turn.

3. The display device according to claim 2, wherein the display control circuit is further configured to perform control in the abnormal state, to cause each of the plurality of the normal scanning line drive circuits to operate using a same shift cycle as a shift cycle used in the normal state.

4. The display device according to claim 2, wherein the display control circuit is further configured to perform control in the abnormal state, to cause each of the plurality of the normal scanning line drive circuits to operate using a shift cycle longer than a shift cycle used in the normal state.

5. The display device according to claim 1, wherein the display control circuit is further configured to perform control in the abnormal state, to cause each of a plurality of the normal scanning line drive circuits to operate while having an all stop period.

6. The display device according to claim 1, wherein:
the display panel further includes a common electrode; and
the power supply circuit is further configured to output a common electrode voltage to the common electrode based on the power supply control signal, the common electrode voltage having different levels between the normal state and the abnormal state.

7. The display device according to claim 1, wherein the display control circuit is further configured to obtain an evaluation value based on the state signal and to perform control to cause each of the plurality of scanning line drive circuits to operate in accordance with a ratio among the evaluation values of the plurality of scanning line drive circuits.

8. The display device according to claim 1, wherein each of the plurality of scanning line drive circuits is further configured to output an output signal of a last stage of the each of the plurality of scanning line drive circuits as the state signal.

9. The display device according to claim 1, wherein the plurality of scanning line drive circuits is arranged inside a pixel area of the display panel.

10. The display device according to claim 1, wherein the plurality of scanning line drive circuits is arranged outside a pixel area of the display panel.

11. The display device according to claim 1, wherein the display panel is a liquid crystal panel.

* * * * *